United States Patent
DeKoning et al.

(10) Patent No.: US 6,591,337 B1
(45) Date of Patent: Jul. 8, 2003

(54) METHOD AND APPARATUS FOR CACHING OBJECTS IN A DISPARATE MANAGEMENT ENVIRONMENT

(75) Inventors: Rodney A. DeKoning, August, KS (US); William P. Delaney, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/286,554

(22) Filed: Apr. 5, 1999

(51) Int. Cl.[7] ............................................. G06F 12/00
(52) U.S. Cl. ........................................ 711/114; 714/6
(58) Field of Search ................................ 711/114, 113, 711/4; 710/129, 8; 714/6; 709/203

(56) References Cited

U.S. PATENT DOCUMENTS

| | | | | |
|---|---|---|---|---|
| 5,287,507 A | | 2/1994 | Hamilton et al. ............ | 395/650 |
| 5,452,447 A | | 9/1995 | Nelson et al. ............... | 395/650 |
| 5,475,840 A | | 12/1995 | Nelson et al. ............... | 395/700 |
| 5,491,820 A | | 2/1996 | Belove et al. ................ | 395/600 |
| 5,608,909 A | | 3/1997 | Atkinson et al. ............. | 395/703 |
| 5,742,752 A | * | 4/1998 | DeKoning ..................... | 714/6 |
| 5,761,705 A | * | 6/1998 | DeKoning et al. ............ | 711/113 |
| 5,860,091 A | * | 1/1999 | Dekoning et al. ............ | 711/114 |
| 5,937,174 A | * | 8/1999 | Weber .......................... | 710/129 |
| 6,148,368 A | * | 11/2000 | DeKoning .................... | 711/113 |
| 6,219,693 B1 | * | 4/2001 | Napolitano et al. .......... | 709/203 |
| 6,366,965 B1 | * | 4/2002 | Binford et al. ................ | 710/8 |
| 6,381,674 B2 | * | 4/2002 | DeKoning et al. ........... | 711/113 |
| 6,389,511 B1 | * | 5/2002 | Kedem ......................... | 711/114 |
| 6,438,647 B1 | * | 8/2002 | Nielson et al. ............... | 711/113 |

* cited by examiner

Primary Examiner—Zarni Maung
Assistant Examiner—Jungwon Chang
(74) Attorney, Agent, or Firm—Suiter West PC LLC

(57) ABSTRACT

A client machine (12) is connected to a network medium (20) for use in managing the operation of a plurality of subsystems (14–18) that are also coupled to the network medium (20). The client machine (12) includes a cache memory (26) for storing management-related objects that have been retrieved by the client machine (12) from the individual subsystems (14–18). When called upon to manage a particular subsystem, the client machine (12) first determines which management related objects will be required to manage the subsystem. The client machine (12) then checks the cache memory (26) to determine whether any of the required objects are located therein before requesting the objects from the associated subsystem. In this manner, only objects that are not available locally are requested from the subsystem, thereby reducing management-related information traffic in the network (10).

29 Claims, 3 Drawing Sheets

METHOD AND APPARATUS FOR CACHING OBJECTS IN A DISPARATE MANAGEMENT ENVIRONMENT

FIELD OF THE INVENTION

The invention relates in general to information networks and, more particularly, to the management of nodes within an information network.

BACKGROUND OF THE INVENTION

An information network comprises a plurality of nodes that are interconnected by communication paths. The nodes in the network comprise sources of and/or end points for data communications within the network. As such, the nodes have the capability to recognize and process data communications from other nodes and/or to forward data transmissions to other nodes. Networks can have many different configurations, or topologies, describing how the nodes are interconnected. For example, networks can be interconnected in a bus configuration, a ring configuration, and a star configuration, to name a few.

In many networks, a subset of the nodes in the network comprise data processing or data storage subsystems that are used by other nodes to perform data processing/storage functions. Such networks generally require management of the subsystem nodes to ensure efficient operation of the overall network. Management functions are generally performed from a central location in the network by a controller node that communicates with the other nodes via the network communication paths. As can be appreciated, network management functions can significantly increase information traffic levels in a network. This increase in traffic levels can compromise the performance of other network operations by, for example, slowing down data delivery rates in the network.

Therefore, there is a need for a network management method and apparatus that is capable of efficiently managing a plurality of subsystem nodes while generating a relatively small amount of network traffic.

SUMMARY OF THE INVENTION

The invention relates to a method and apparatus for use in managing the operation of a plurality of subsystems within an information network. The method-and apparatus are capable of efficiently managing the network subsystems while generating a relatively low level of network traffic. The management functions are performed from a client machine within the network that is coupled to the subsystems by the network transmission medium. The client machine includes a cache memory for use in storing management-related objects that have been retrieved from the subsystems via the network medium.

When managing a particular subsystem, the client machine first determines which management-related objects are required to manage the subsystem. In a preferred embodiment of the invention, this is achieved by obtaining a list of objects from the subsystem. The client machine then checks the cache memory to determine whether any of the required objects are stored therein. If one or more of the required objects are stored within the cache memory, the client machine reads these objects from the memory for use in managing the associated subsystem. The client machine then sends a request to the subsystem, via the network medium, for delivery of the other required objects. When the client machine has obtained all of the required objects, management of the subsystem is commenced. Because the client machine requests less than all of the required objects from the subsystem, network traffic is significantly reduced.

DETAILED DESCRIPTION OF THE PREFERRED EMBODIMENT

The present invention relates to a system for managing a plurality of network nodes/subsystems in a manner that generates a reduced level of network traffic. The system is capable of providing better user response times within the network by reducing network overhead associated with the performance of management functions. The system utilizes a cache memory within a management controller node of the network to store objects retrieved from the managed nodes. The cache memory can be part of disk storage, RAM that communicates with controlling or processing hardware, or any other convenient memory device. The stored objects are then read from the cache memory by the management controller node to manage other nodes in the network, thereby circumventing the need to reacquire the objects from the other managed nodes via the network. The system is most valuable in networks where the managed nodes/subsystems include many management related objects that are common to two or more of the managed nodes/subsystems. The system can be used to manage virtually any number of subsystems within a network.

Figure 1:
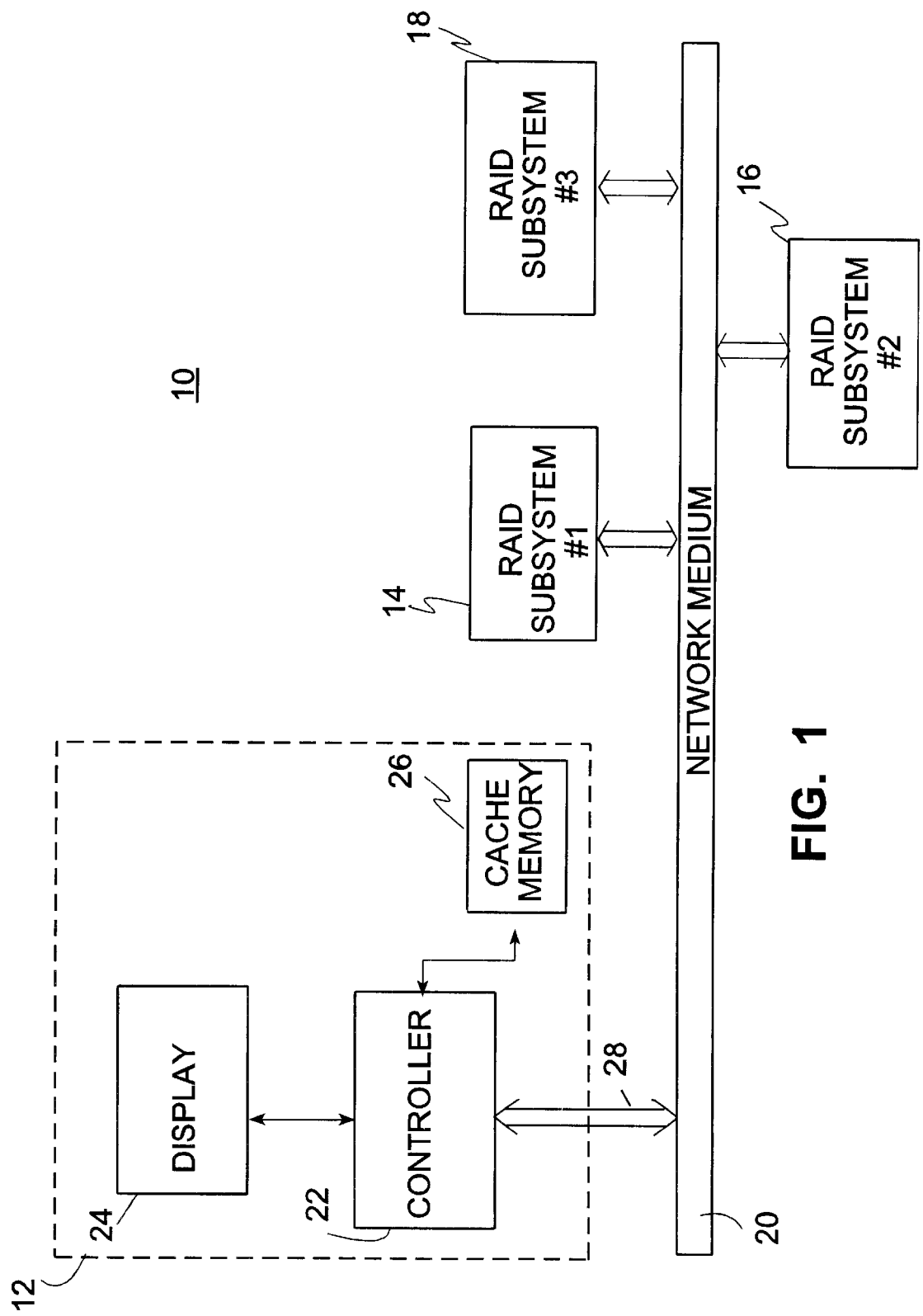
FIG. 1 is a block diagram illustrating a network having a plurality of subsystems in accordance with one embodiment of the present invention.

FIG. 1 is a block diagram illustrating a network 10 in accordance with one embodiment of the present invention. The network 10 includes a client machine 12 and a plurality of subsystems 14–18 that are all coupled to a common network medium 20. The network 10 can also include other nodes (not shown), such as various user nodes, that are also connected to the network medium 20. In the illustrated embodiment, the subsystems 14–18 of network 10 are all RAID (i.e., redundant array of inexpensive disks) based subsystems that are used by the network 10 to store data in a redundant manner. It should be appreciated, however, that the principles of the present invention are not limited to use with RAID subsystems or data storage subsystems.

The client machine 12 is operative for managing the operation and maintenance of the RAID subsystems 14–18 via the network medium 20. In one embodiment of the invention, the client machine 12 comprises a personal computer. As illustrated in FIG. 1, the client machine 12 includes a controller 22, a display 24, and a cache memory 26. The controller 22 can include virtually any type of processor that is capable of executing management routines. That is, the controller 22 can include a general purpose microprocessor (GPP), a digital signal processor (DSP), a reduced instruction set computer (RISC), a complex instruction set computer (CISC), or any other processor type. Alternatively, the controller 22 can include reconfigurable hardware, such as, for example, a field programmable gate array (FPGA) unit.

The display 24 is coupled to and controlled by the controller 22 for displaying information/options to a user of the client machine 12 during the performance of management functions. As such, the display 24 can include virtually any form of video display, such as a standard computer monitor. In a preferred embodiment of the invention, the display 24 is used to establish a graphical user interface (GUI) between the user and the client machine 12 for use in managing the subsystems 14–18.

The cache memory 26 is coupled to the controller 22 for use in storing management related objects associated with the subsystems 14–18. The cache memory 26 can include virtually any form of digital data memory of the appropriate memory size. For example, in one embodiment of the invention, the cache memory 26 includes a discrete semiconductor memory disposed upon the motherboard of the controller 22. In another embodiment, the cache memory 26 is part of a board assembly that is inserted into an expansion slot associated with the controller 22. In yet another approach, the cache memory 26 includes a dedicated portion of the main random access memory (RAM) within the controller 22. In still another embodiment, the cache memory 26 comprises a dedicated portion of a mass storage unit coupled to the controller 22, such as a magnetic disk drive. As can be appreciated, the cache memory 26 can include any form of memory that is accessible by the controller 26 by means other than the network medium 20.

The network medium 20 can include any type of data transmission medium that is capable of transferring data and commands between the various nodes. For example, the network medium can include twisted pair transmission line, coaxial cable transmission line, optical fiber line, or others. In addition, the invention can be used in a wireless information network using air as a network medium. The network medium 20 can be connected in virtually any network configuration, including, for example, bus, ring, and star configurations. In a preferred embodiment, the network medium 20 comprises an ETHERNET backbone using a carrier sense multiple access with collision detection (CSMA/CD) protocol to control access to the backbone. Requests from the controller 22 are transferred to the network medium 20 via connection 28 where they can be read by the RAID subsystems 14–18. In general, each of the subsystems 14–18 will only read signals on the network medium 20 that are addressed to that subsystem. In this manner, the controller 22 can independently manage and control each of the subsystems 14–18. In other embodiments, passing of management information can be accomplished over the same physical connectivity hardware that is used to pass other information including data. These can include physical buses such as fiber channels and/or parallel SCSI.

The RAID subsystems 14–18 are each multiple disk data storage devices that are capable of storing data in a redundant manner so that individual disk failures do not result in a loss of data. A typical RAID subsystem generally includes a plurality of disk drives, one or more fans, a power supply, and a RAID controller. Information to be stored in one of the RAID subsystems 14–18 is delivered to the subsystem via the network medium 20. The RAID controller within the addressed subsystem then causes the information to be stored in a predetermined redundant manner within the plurality of disk drives. Any one of a number of different RAID protocols can be used to control the storage of information in the disk drives.

Each of the RAID subsystems 14–18 includes a plurality of software objects for use in performing management functions for the subsystem. The software objects are stored within the subsystem, typically within the individual drives of the subsystem. In a preferred embodiment of the invention, the software objects define a user interface between the corresponding subsystem and a user viewing display 24 of client machine 12. For example, some of the objects can define images that appear on the display 24 during a management operation. Other objects define methods for accepting input from the user in response to the images on the display 24. In one embodiment of the invention, for example, objects are used that define certain GUI interaction methods (e.g., select, drag, drop on, etc.) for use with specific images. Still other objects may relate to communications between the client machine 12 and a corresponding subsystem during a management operation to control the configuration of the subsystem in response to input from the user. As can be appreciated, many other types of objects may also be used in accordance with the present invention.

A subsystem will generally store at least one object for each of the physical entities within the subsystem that are to be manipulated or monitored by the client machine/user. For example, in a RAID subsystem, individual objects might be stored for each of the disk drives in the subsystem, the controller, the fan(s), and the power supply. Subsystems may also store objects related to various logical entities within the subsystem. For example, objects may be stored in the subsystems for logical entities such as drive groups and volumes. In general, the objects can be written in any programming language. In a preferred embodiment of the invention, the objects comprise JAVA applets.

In a typical subsystem management procedure, the controller 22 first determines that a particular subsystem in the network 10 (e.g., subsystem 14) is to be managed. This determination can be made in a number of different ways. For example, the controller 22 can receive an input command from the user, via a corresponding input device (not shown), requesting that a management procedure be initiated for a particular subsystem. Alternatively, the controller 22 may be programmed to perform periodic management functions for each of the subsystems 14–18. Once a management determination has been made, the controller 22 will send a command to the appropriate subsystem, via the network medium 20, requesting all of the objects that are stored within the subsystem that relate to the management function to be performed. The subsystem 14 then transfers these objects to the controller 22 via the network medium 20.

As can be appreciated, the transfer of these management related objects to the client machine 12 via the network medium 20 can significantly increase information traffic on the network medium 20. This increase in traffic can compromise, among other things, network response times of all devices attached to the network. In conceiving of the present invention it was appreciated that, even though the subsystems in the network 10 may be significantly different from one another in overall structure and configuration, many of the physical and logical entities within the subsystems can be common to multiple subsystems. Because some of the physical and logical entities are the same in different subsystems, the associated objects stored in the subsystems are the same. Thus, in accordance with the present invention, the cache memory 26 in the client machine 12 is used for storing objects previously retrieved from one of the subsystems 14–18 for future use in association with other of the subsystems 14–18.

Because the objects are stored locally within the client machine 12, these objects do not have to be transferred over the network medium 20 later when they are needed to manage the other subsystems. With respect to caching such objects, an important factor is to store or keep at ready access those objects that overlap among two or more subsystems. By way of example, the client machine 12 may manage multiple storage arrays having different configuration versions, but where a first version has one or more of the same objects as the second version. In such a case, it is desirable to cache objects that are common among the storage arrays and are managed by the same client machine 12.

Figure 2:
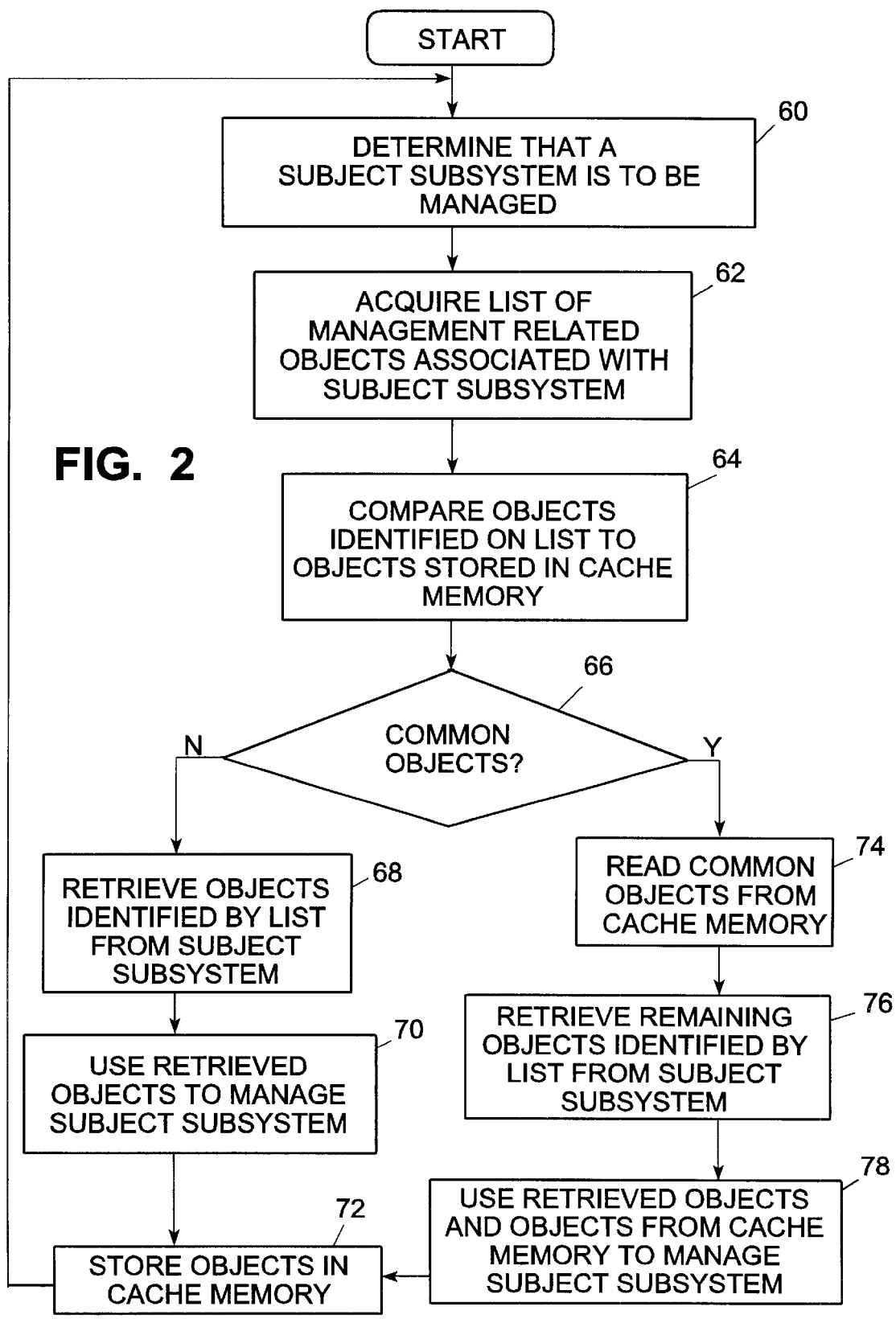
FIG. 2 is a flowchart illustrating a method for use in reducing management-related network traffic in accordance with one embodiment of the present invention.

FIG. 2 is a flowchart illustrating a method for using the cache memory 26 during management of the subsystems 14–18 in accordance with one embodiment of the present invention. In. the preferred embodiment of the invention, the method is implemented almost entirely within the controller 22 of the client machine 12 of FIG. 1 by executing appropriate management software. First, a determination is made that a particular subsystem (i.e., the subject subsystem) needs to be managed (step 60). As described above, this determination can be made based upon user input, a predetermined management schedule, or other means. A list is then acquired that identifies the objects stored within the subject subsystem that are required for managing the subsystem (step 62). In a preferred embodiment, the list is acquired from the subject subsystem using the network medium 20. That is, a request is delivered to the subject subsystem over the network medium 20 and the subject subsystem then transfers the list back over the network medium 20. In another embodiment, the lists associated with each of the subsystems 14–18 are stored within a list memory coupled to or within the client machine 12. A list is acquired by reading it from the list memory. The list memory can be loaded during an initialization period (e.g., at system startup) by downloading the lists from the corresponding subsystems 14–18 over the network medium 20 and storing them in the list memory. The list memory is then updated and modified as individual subsystems, are added/removed/modified.

After the list has been acquired, the objects on the list are compared to the objects stored within the cache memory 26 (step 64). In a preferred embodiment of the invention, each of the management related objects in the network is given a globally unique identifier. Accordingly, the comparison comprises crosschecking the identifiers on the list against identifiers within the cache memory 26. If it found that the list does not identify any of the objects that are stored within the cache memory 26, then all of the objects identified by the list are retrieved from the subject subsystem via the network medium 20 (steps 66 and 68). The retrieved objects are then used by the client machine 12 to manage the subject subsystem (step 70). On the other hand, if the list does identify one or more objects stored within the cache memory 26, then the one or more objects are read from the cache memory 26 (steps 66 and 74) and only the remaining objects on the list are retrieved from the subject subsystem via the network medium 20 (step 76). The objects read from the cache memory 26 and the objects retrieved from the subject subsystem are then used by the client machine 12 to manage the subject subsystem (step 78).

Regardless of whether objects from the cache memory 26 are used during a particular management episode, a decision is made as to whether to store some or all of the new objects retrieved from the subject subsystem in the cache memory 26 (step 72). In the preferred embodiment of the present invention, the cache memory 26 has a fixed size that is considerably less than the size required to store all of the objects associated with the subsystems of the network. Therefore, intelligence is provided for determining which of the objects that are newly retrieved from the subsystems 14–18 are to be stored in the cache memory 26. If the cache memory 26 is empty or only partially full, then all of the most recently retrieved objects can be stored therein. However, once the cache memory 26 becomes full, decisions need to be made as to which, if any, of the old objects within the cache memory 26 should be replaced with newly retrieved objects. In general, caching methods are desired that will result in a greatest overall reduction in network traffic. Therefore, in one embodiment of the present invention, means are provided for tracking the frequency with which particular objects are utilized. Caching decisions are then made based upon this frequency information. Alternatively, any number of existing cache management algorithms (e.g., LRU) can be utilized in accordance with the present invention. In one embodiment, the storage arrays of interest can be queried by the client machine 12 to obtain a list of objects based on input from the queries. A determination is then made regarding the identification of those objects from the list that have the most or greater interest. Those objects are selected and stored in the cache memory 26. Regardless, of the algorithm(s) employed, it should be appreciated that the caching decisions can be made at any time after the newly retrieved objects are received by the client machine 12. That is, the client machine does not need to wait until after the management activity has ended. After the appropriate objects have been stored in the cache memory 26, the method returns to step 60 and waits for a next management determination.

Figure 3:
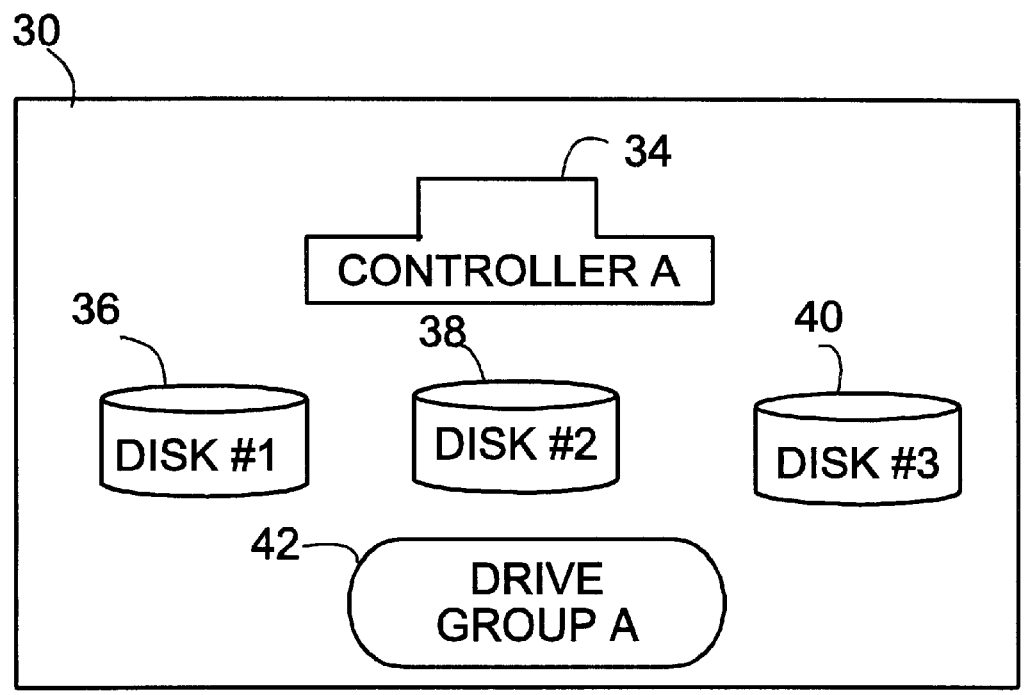
FIG. 3 is a diagram illustrating a screen image that can be displayed to a user on a display for use in managing a first subsystem in accordance with the present invention.
Figure 4:
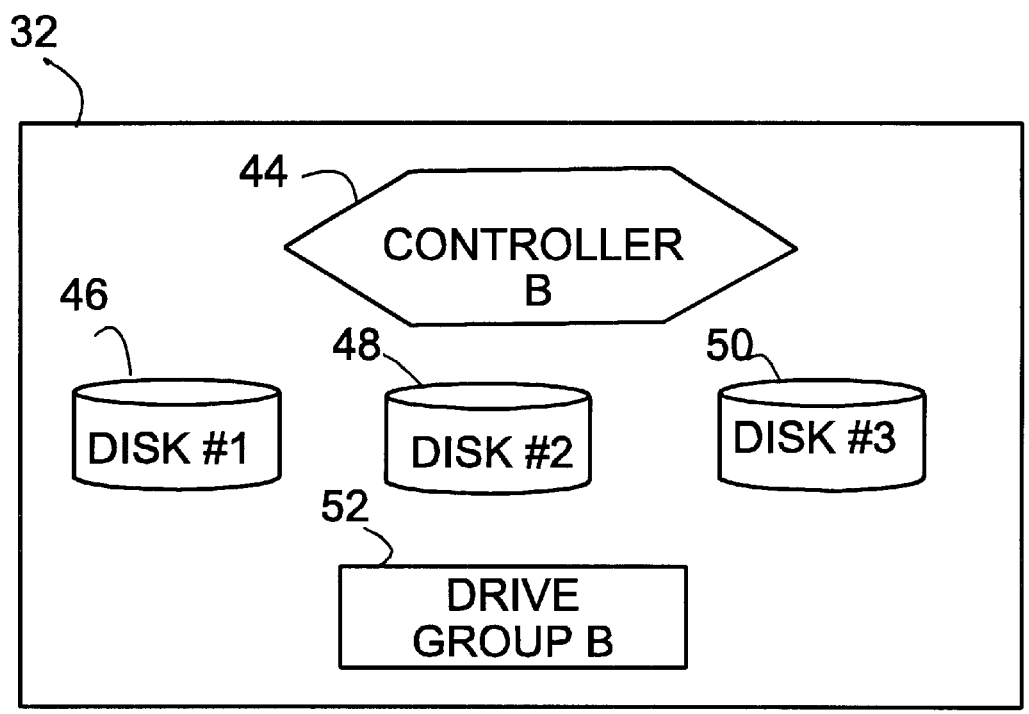
FIG. 4 is a diagram illustrating a screen image that can be displayed to a user on a display for use in managing a second subsystem in accordance with the present invention.

As described above, in a preferred embodiment of the invention, the software objects that are retrieved from the subsystems 14–18 are used to provide an interface to an external user. Some of the objects will be image objects that can be used to generate images on the display 24. Other objects will be method objects that provide interfaces for physical and logical abstractions., where the physical abstractions can include system components such as disk drives, controllers, power supplies, fans, etc. and logical abstractions can include RAID volumes, caching, and RAID hot spare factors. FIGS. 3 and 4 illustrate two possible screen images 30, 32 that can be presented to the user (via display 24) during typical management operations. FIG. 3 represents the screen image 30 that is displayed while managing a first RAID subsystem (e.g., RAID subsystem 16) in the network and FIG. 4 represents the screen image 32 that is displayed while managing a second RAID subsystem (e.g., RAID subsystem 18) in the network 10.

As shown in FIGS. 3 and 4, each of the screen images 30, 32 include individual images corresponding to each of the managed elements of the corresponding subsystems. That is, screen image 30 of FIG. 3 includes a controller A image 34, a disk #1 image 36, a disk #2 image 38, a disk #3 image 40, and a drive group A image 42. Similarly, screen image 32 of FIG. 4 includes a controller B image 44, a disk #1 image 46, a disk #2 image 48, a disk #3 image 50, and a drive group B image 52. During a management operation for the first subsystem, the user interacts with the screen image 30 of FIG. 3 to perform various management related operations in relation to the displayed elements. For example, various GUI related procedures will be available to the user for inputting requests, commands, and/or queries with respect to the elements using an input device, such as a mouse. Similarly, during a management operation for the second subsystem, the user interacts with the screen image 32 of FIG. 4. Each of the individual element images 34–42, 44–52 within the screen images 30, 32 will have one or more method objects associated with it for, for example, processing input from the user.

Because the first and second RAID subsystems use identical disk drives models, the disk images in both screen image 30 and screen image 32 are identical. Correspondingly, the image objects used to generate the disk images of the two screen images 30, 32 are identical. On the other hand, the first and second RAID subsystems use different controllers and different drive group arrangements from one another. Therefore, different image objects are used to generate these images for the two different subsystems and the resulting images 34, 32 and 44, 52 are different. In addition, even though identical disk images are used in screen image 30 and screen image 32, the method images associated with the disk images in the two screen images may be different. For example, the image object used to generate the disk #1 image 36 of FIG. 3 might be identical to the image object used to generate the disk #1 image 46 of FIG. 4, but the method object used to define the interaction between the user and the two images 36, 46 can be different.

As an example of the operation of the present invention, assume that the cache memory 26 is empty and a decision is made to manage the first RAID subsystem. The controller 22 (see FIG. 1) acquires the list associated with the first subsystem and determines that the cache memory 26 is empty. The controller 22 then requests and receives all of the objects on the list from the first subsystem via the network medium 20. The received objects are then stored in the cache memory 26. The controller 22 then generates the screen image 30 of FIG. 3 and accepts input from the user. Commands are then delivered to the first subsystem via the network medium 20 to, for example, reconfigure the first subsystem in accordance with the user's desires. The user now indicates that he wishes to manage the second subsystem. The controller 22 acquires the list for the second subsystem and compares it to the objects stored in the cache memory 20. The controller 22 determines that the disk image objects identified by the list as well as a number of the method objects on the list are stored within the cache memory 26. The controller 22 proceeds to read these objects from the cache memory 26 into the RAM of the controller 22. The controller 22 then sends a request to the second subsystem, via the network medium 20, for the other listed objects. Once the other objects have been received, the controller 22 generates the screen image 32 of FIG. 4 on display 24 and accepts input from the user. Commands are then delivered to the second subsystem to reconfigure it in accordance with the user's desires.

As can be appreciated, the principles of the present invention can be used to significantly reduce network traffic caused by subsystem management functions. In general, the more commonality between the elements of the different subsystems, the greater the overall reduction in network traffic. Although the illustrated embodiment relates to a network having only three subsystems, it should be appreciated that the principles of the present invention can be advantageously applied in networks having any number of subsystems to manage. In addition, all of the subsystems of the network do not have to be directly coupled to the network medium in accordance with the present invention. For example, multiple subsystems can be linked to the network medium via a common connection.

Although the present invention has been described in conjunction with its preferred embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method for managing a number of subsystems by reducing time and bandwidth related to providing objects that are representative of components of the subsystems, comprising:

obtaining a first list related to a first subsystem using a client machine, said first list identifying a first plurality of objects, said first plurality of objects including a first object;

retrieving said first object of said first plurality of objects from said first subsystem;

utilizing said first object of said first plurality of objects by said client machine to manage said first subsystem;

caching said first object of said first plurality of objects in a memory of said client machine;

securing a second list related to a second subsystem using said client machine, said second list identifying a second plurality of objects, said second plurality of objects including said first object;

acquiring, after said step of securing, said first object from said memory of said client machine; and using said first object acquired from said memory of said client machine to manage said second subsystem, said first subsystem and said second subsystem each having a controller wherein common objects of said first plurality of objects and said second plurality of objects are stored in said memory.

2. The method, as claimed in claim 1, wherein:
said step of obtaining includes requesting said first list from said first subsystem.

3. The method, as claimed in claim 1, wherein:
said step of securing includes requesting said second list from said second subsystem.

4. A method, as claimed in claim 3, wherein:
said first object relates to descriptors related to how said first object of said first plurality functions with said client machine.

5. A method, as claimed in claim 3, wherein:
said first object relates to descriptors related to registered events associated with said first subsystem.

6. A method, as claimed in claim 3, wherein:
said first object of said first plurality relates to object methods that are invoked using said client machine.

7. The method, as claimed in claim 1, wherein:
said step of caching includes utilizing a predetermined cache management algorithm.

8. The method, as claimed in claim 7, wherein:
said predetermined cache management algorithm includes least recently used (LRU).

9. A method, as claimed in claim 1, wherein:
said first object relates to an image.

10. A method, as claimed in claim 1, wherein:
said step of acquiring includes acquiring from said second subsystem all of said objects of said second plurality that are not available in said memory.

11. The method of claim 1, wherein said memory is a cache memory.

12. The method of claim 1, wherein said first and second subsystems are each. communicatively coupled to said client machine over a network medium.

13. A system for managing objects representative of components of a number of subsystems, comprising:

a plurality of subsystems each having a number of components, said plurality of subsystems having first and second subsystems, each of said components being defined using at least one object, said first subsystem having a first plurality of objects including a first object and said second subsystem having a second plurality of objects including a first object;

a client machine that utilizes said objects of said first and second subsystems, said client machine including a memory; and a network for enabling communications between said client and said first and second subsystems, each of said first and second subsystems being directly coupled to said network;

wherein said first object of said first plurality of objects is equivalent to said first object of said second plurality of objects and in which said client machine manages said first subsystem using said first plurality of objects obtained from said first subsystem and, after managing said first subsystem, said client machine manages said second subsystem using said first object of said first plurality of objects obtained from said memory of said client machine, wherein said first and second subsystems each have a controller.

14. A system, as claimed in claim 13, wherein:

at least said first object of said first plurality of objects is available as at least part of a Java applet.

15. A system, as claimed in claim 13, wherein:

said first subsystem includes a first storage subsystem and said second subsystem includes a second storage subsystem, said second storage subsystem storing a number of objects that are the same as objects that are stored in said first storage subsystem including said first object of said second plurality of objects.

16. A system, as claimed in claim 13, wherein:

said client machine includes a management application for accessing each of said first and second subsystems.

17. A system, as claimed in claim 13, wherein:

said components include physical components and logical components and in which said physical components include a plurality of the following: fans, controllers, drives and power supplies and said logical components include drive groups and storage volumes.

18. A system, as claimed in claim 13, wherein:

said first subsystem includes a first storage subsystem that stores a first list to identify said first plurality of objects and in which said client machine accesses said first list when determining to obtain said first plurality of objects.

19. In a system having a client machine that is coupled to a plurality of subsystems via an information transmission medium, wherein each of the plurality of subsystems includes a group of objects stored within the subsystem for use in managing the subsystem, a program for execution on the client machine for managing the plurality of subsystems, said program including:

a first portion for use in retrieving a first set of objects from a first subsystem via the information transmission medium;

a second portion for use managing the first subsystem utilizing said first set of objects;

a third portion for use in storing at least one object of said first set of objects in a cache memory associated with the client machine;

a fourth portion for use in determining whether a first group of objects stored within a second subsystem includes a duplicate of said at least one object stored in the cache memory;

a fifth portion for use in acquiring, when the first group of objects includes said duplicate, a second set of objects from the second subsystem that does not include said duplicate via the information transmission medium; and a sixth portion for use in managing the second subsystem using the second set of objects acquired from the second subsystem and the at least one object from the cache memory, wherein the first and second subsystem each have a controller, wherein said cache memory is external to said first subsystem and is external to said second subsystem.

20. The program, as claimed in claim 19, wherein:

said fourth portion includes a first subportion for use in obtaining a list of objects that are stored in said second subsystem and a second subportion for use in comparing said list of objects to objects stored within said cache memory.

21. The program, as claimed in claim 19, wherein:

said second portion includes a first subportion for use in displaying an image related to said first subsystem on a display of said client machine using at least one of said first set of objects.

22. The program, as claimed in claim 19, where in:

said fifth portion includes a first subportion for delivering a request to said second subsystem, via the information transmission medium, requesting a delivery of objects other than said duplicate from said second subsystem.

23. A system for managing objects representative of components of a number of subsystems, comprising:

a network medium;

a first subsystem providing a first list related to said first subsystem, said first list, identifying a first plurality of objects;

a second subsystem providing a second list related to said second subsystem, said second list identifying a second plurality of objects; and a client machine having a controller and a cache memory, said client machine directly communicatively coupled to said first subsystem over said network medium, said client machine directly communicatively coupled to said second subsystem over said network medium;

wherein said client machine retrieves one of said first list and said second list, compares objects identified on said one of said first list and said second list with objects stored in said cache memory to determine common objects and non-common objects between said cache memory and one of said first subsystem and said second subsystem corresponding to said one of said first list and said second list, retrieving said common objects from said cache memory, retrieving said non-common objects from said one of said first subsystem and said second subsystem, and using said retrieved common and non-common objects to manage said one of said first subsystem or said second subsystem.

24. The system of claim 23, wherein said cache memory is directly coupled to said controller.

25. The system of claim 24, wherein said cache memory is not directly coupled to said network medium.

26. A method for managing a number of subsystems by reducing time and bandwidth related to providing objects that are representative of components of the subsystems, comprising:

obtaining a first list related to a first subsystem using a client machine, said first list identifying a first plurality of objects, said first plurality of objects including a first object;
- retrieving said first object of said first plurality of objects from said first subsystem over a network medium;
- utilizing said first object of said first plurality of objects by said client machine to manage said first subsystem;
- caching said first object of said first plurality of objects in a memory within said client machine such that said first object is added to a set of cached objects;
- obtaining a second list related to a second subsystem using said client machine, said second list identifying a second plurality of objects; and
- determining if any of said second plurality of objects have equivalents in, said set of cached objects.

27. The method of claim 26, further comprising, if any of said second plurality of objects have equivalents in said set of cached objects, retrieving: said equivalent objects from said memory and managing said second subsystem with said equivalent objects retrieved from said memory.

28. The method of claim 26, further comprising, if any of said second plurality of objects do not have equivalents in said set of cached objects, retrieving said non-equivalent objects from said second subsystem and managing said second subsystem with said non-equivalent objects retrieved from said second subsystem over said network medium.

29. The method of claim 28, further comprising caching said non-equivalent objects from said second subsystem in said memory within said client machine such that said non-equivalent objects are added to said set of cached objects.

* * * * *